(12) United States Patent
Seljeseth

(10) Patent No.: US 10,621,835 B2
(45) Date of Patent: Apr. 14, 2020

(54) DUAL CHECKOUT SYSTEM

(71) Applicant: PeoplePos Ltd., London (GB)

(72) Inventor: Kay Seljeseth, Bærums Verk (NO)

(73) Assignee: PEOPLEPOS LTD., London (GB)

( * ) Notice: Subject to any disclaimer, the term of this patent is extended or adjusted under 35 U.S.C. 154(b) by 79 days.

(21) Appl. No.: 16/058,322

(22) Filed: Aug. 8, 2018

(65) Prior Publication Data

US 2019/0066453 A1 Feb. 28, 2019

Related U.S. Application Data

(63) Continuation of application No. PCT/IB2017/050674, filed on Feb. 8, 2017.

(30) Foreign Application Priority Data

Feb. 9, 2016 (NO) .................................... 20160212

(51) Int. Cl.
*H04L 9/32* (2006.01)
*G07G 1/00* (2006.01)
(Continued)

(52) U.S. Cl.
CPC .......... *G07G 1/0045* (2013.01); *A47F 9/046* (2013.01); *G06Q 20/20* (2013.01); *G07G 1/0018* (2013.01); *G07G 1/0036* (2013.01); *G07G 1/12* (2013.01)

(58) Field of Classification Search
CPC .. G07G 1/0045; G07G 1/0018; G07G 1/0036; G07G 1/12; A47F 9/046; G06Q 20/20
(Continued)

(56) References Cited

U.S. PATENT DOCUMENTS

| 5,497,853 A | 3/1996 | Collins, Jr. et al. |
| 5,752,582 A | 5/1998 | Hayward |

(Continued)

FOREIGN PATENT DOCUMENTS

| EP | 0531265 A1 | 3/1993 |
| EP | 0638883 A2 | 2/1995 |

(Continued)

OTHER PUBLICATIONS

International Search Report issued by the European Patent Office acting as the International Searching Authority in relation to International Application No. PCT/IB2017/050674 dated May 10, 2017 (4 pages).

(Continued)

*Primary Examiner* — Daniel A Hess
(74) *Attorney, Agent, or Firm* — Robert P. Michal, Esq.; Carter, DeLuca & Farrell LLP

(57) ABSTRACT

The present invention discloses a checkout counter at least comprising a right/left-hand side registration system for registration of commodities in a checkout counter comprising a right/left-hand side registration device with an interface with a computer, and a cashier registration system for registration of commodities in a checkout counter comprising a cashier registration device with an interface with a computer, a right-hand side motion detector with an interface with the computer, and a left-hand side motion detector with an interface with a computer. The invention also discloses a method for operation of the checkout counter and its elements.

35 Claims, 6 Drawing Sheets

(51) Int. Cl.
 *G07G 1/12* (2006.01)
 *G06Q 20/20* (2012.01)
 *A47F 9/04* (2006.01)

(58) Field of Classification Search
 USPC .......................................................... 235/383
 See application file for complete search history.

(56) References Cited

U.S. PATENT DOCUMENTS

| | | |
|---|---|---|
| 6,540,137 B1 | 4/2003 | Forsythe et al. |
| 2003/0018897 A1* | 1/2003 | Bellis, Jr. ............. G06Q 20/341 |
| | | 713/182 |
| 2009/0134221 A1 | 5/2009 | Zhu et al. |
| 2012/0187194 A1 | 7/2012 | Svetal et al. |
| 2015/0272349 A1 | 10/2015 | Seljeseth |

FOREIGN PATENT DOCUMENTS

| | | |
|---|---|---|
| FR | 2732876 A1 | 10/1996 |
| WO | WO-2014068446 A1 | 5/2014 |

OTHER PUBLICATIONS

Written Opinion of the International Searching Authority issued by the European Patent Office acting as the International Searching Authority in relation to International Application No. PCT/IB2017/050674 dated May 10, 2017 (6 pages).

Norwegian Search Report issued by the Norwegian Industrial Property Office in relation to Norweigan Patent Application No. 20160212 dated Jul. 27, 2016 (2 pages).

* cited by examiner

100

100

DUAL CHECKOUT SYSTEM

CROSS-REFERENCE TO RELATED APPLICATIONS

This application is a continuation of PCT International Application No. PCT/IB2017/050674 filed Feb. 8, 2017, which claims priority to Norwegian Patent Application No. 20160212, filed Feb. 9, 2016, the disclosure of each of these applications is expressly incorporated herein by reference in their entirety.

TECHNICAL FIELD

The present invention relates to checkout counters and in particular to embodiments of registration areas of checkout counters, it also relates to the operation of checkout counters according to the present invention.

BACKGROUND ART

A typical checkout counter (ref FIG. 1) in use in retail stores includes a loading area, a registration area and a packing area. The loading area may be provided with conveyor belts which convey goods from the loading area and into the registration area. At the registration areas goods are traditionally registered by a cashier. The registration process may include the use of automatic scanning equipment such as bar code readers operated by the cashier. The next zone is the packing area; goods are either conveyed or manually fed from the registration area to the packing area.

Recently self-service checkout counters have been introduced. Their layout and design usually resembles that of the traditional checkout counter shown in FIG. 1. However the customer is then exchanged with the cashier and a payment zone/area is added. The customer then loads the goods into the loading area or directly into the registration area where the goods are registered. After all goods have been registered the customer swipes a debit card or credit card in a card reader thereby finishing the transaction process between the goods provider and himself.

A problem with prior art checkout counters manual and self-service alike, is the possibility of erroneous scanning of goods. Even more prominent is the lack of efficiency encountered by self-service checkout counters.

It is known from U.S. Pat. No. 6,540,137 B1 a checkout terminal which either provides self-service registration of goods or operator registration of goods by reconfiguring a checkout terminal between two modes, i.e. self-service and operator driven.

U.S. Pat. No. 5,752,582 disclose a checkout station which allows a single cashier to assist multiple customers simultaneously.

It is an object of the present invention to overcome the drawbacks related to possible erroneous registration of goods and not at least to provide an efficient checkout counter system.

DISCLOSURE OF INVENTION

It is one object of the invention to provide a technical solution to increase registration capacity/speed of registration zones for checkout counters.

More particularly the present invention discloses:

A right/left-hand side registration system for registration of commodities in a checkout counter comprising:

a. a right/left-hand side registration device with an interface with a computer;
b. a right/left-hand side entrance motion detector with an interface with the computer; and
c. a right/left-hand side exit motion detector with an interface with the computer.

In one aspect the right/left-hand side registration system where the right/left-hand side entrance motion detector is configured to transmit a "true" signal to the computer if a hand movement and/or commodity movement is sensed by the right/left-hand side entrance motion detector.

The present invention also discloses a cashier registration system for registration of commodities in a checkout counter comprising:

a) a cashier registration device with an interface with a computer;
b) a right-hand side motion detector with an interface with the computer; and
c) a left-hand side motion detector with an interface with the computer.

The present invention also discloses checkout counter at least comprising:

a. a right/left-hand side registration system for registration of commodities in a checkout counter comprising:
 i. a right/left-hand side registration device with an interface with a computer;
b. a cashier registration system for registration of commodities in a checkout counter comprising:
 ii. a cashier registration device with an interface with a computer;
 iii. a right-hand side motion detector with an interface with the computer; and
 iv. a left-hand side motion detector with an interface with a computer.

In one aspect the right/left-hand side registration system for registration of commodities in a checkout counter further comprises:
a right/left-hand side entrance motion detector with an interface with the computer.

The present invention also includes a method for a right/left-hand side registration process for registration of commodities in a checkout counter at least comprising the steps of:

a. providing a right/left-hand side registration device with an interface with a computer;
b. providing a right/left-hand side entrance motion detector with an interface with the computer; and
c. providing a right/left-hand side exit motion detector with an interface with the computer.

The present invention also includes a method for a cashier registration process for registration of commodities in a checkout counter at least comprising the steps of:

a. providing a cashier registration device with an interface with a computer;
b. providing a right-hand side motion detector which can be arranged to the right of the cashier registration device with an interface with the computer; and
c. providing a left-hand side motion detector which can be arranged to the left of the cashier registration device with an interface with the computer.

The method for the cashier registration process may further comprise the steps of:
transmitting from the right-hand side motion detector a "true" signal to the computer if a hand movement and/or commodity movement is sensed by the right-hand side motion detector.

The method for the cashier registration process may further comprise the steps of:
transmitting from the left-hand side motion detector a "true" signal to the computer if a hand movement and/or commodity movement is sensed by the left-hand side motion detector. The computer may execute the following sequential steps:
   a. testing if the left-hand side motion detector="true" or "false",
   b. testing if the cashier registration device="true" or "false", and
   c. testing if the left-hand side motion detector="true" or "false", and
   d. determination step: correct registration of commodities and registration to be carried to the left-hand side customer if:
      i. step a and b and c is "true", or
      ii. step a and b is "true", or
      iii. step b and c is "true".

The present invention also includes a method for a registration process for registration of commodities in a checkout counter at least comprising the steps of:
   a. providing a right/left-hand side registration system for registration of commodities in a checkout counter comprising:
      i. a right/left-hand side registration device with an interface with a computer;
   b. providing a cashier registration system for registration of commodities in a checkout counter comprising:
      ii. a cashier registration device with an interface with a computer;
      iii. a right-hand side motion detector with an interface with the computer; and
      iv. a left-hand side motion detector with an interface with a computer.

In one aspect it is provided a method for a registration process for registration of commodities in a checkout counter at least comprising the steps of:
   a. providing a customer registration system including:
      i. providing a right-hand side registration system independent of a left-hand side registration system for registration of commodities in a checkout counter where a right-hand side customer (105a) is associated with the right-hand side of the checkout counter and the left-hand side customer (105b) is associated with the left-hand side of the checkout counter comprising:
         1. providing a right-hand side registration means (245a) associated with the right-hand side customer (105a) with an interface with a computer;
         2. providing a left-hand side registration means (245b) associated with the left-hand side customer (105b) with a computer interface;
   b. providing a cashier registration system for registration of commodities in a checkout counter comprising:
      i. a cashier registration device (140) with an interface with a computer;
      ii. a right-hand side motion detector (125a) arranged to the right of the cashier registration device (140) with an interface with the computer; and
      iii. a left-hand side motion detector (125b) arranged to the left of the cashier registration device (140) with an interface with a computer.

In one aspect the method for the registration process for registration of commodities in the checkout counter further comprises the steps of: providing a right/left-hand side entrance motion detector with an interface with the computer to the right/left-hand side registration system for registration of commodities in a checkout counter.

In another aspect the method for the registration process for registration of commodities in the checkout counter further comprises the steps of: providing a righthand side exit motion detector with an interface with the computer to the righthand side registration system for registration of commodities in a checkout counter, and providing a left-hand side exit motion detector with an interface with the computer to the left-hand side registration system for registration of commodities in a checkout counter.

In another aspect the method the method for the registration process for registration of commodities in the checkout counter further comprises the steps of:
   providing a computer program which determines whether a correct registration of commodities has taken place on the right/left-hand side to the computer with interface with the right/left-hand side registration system.

Other advantageous features will be apparent from the accompanying claims.

BRIEF DESCRIPTION OF DRAWINGS

Following is a brief description of the drawings in order to make the invention more readily understandable, the discussion that follows will refer to the accompanying drawings, in which.

MODE(S) FOR CARRYING OUT THE INVENTION

Figure 1:
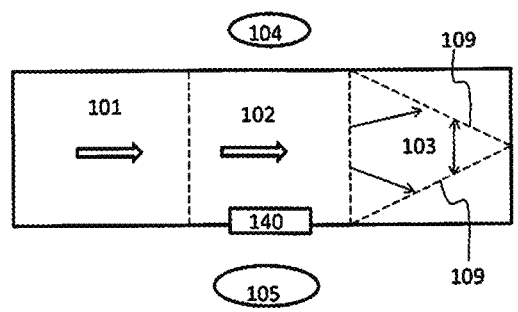
FIG. 1 shows a prior art checkout counter.

In the following it is firstly disclosed general embodiments in accordance to the present invention, thereafter particular exemplary embodiments will be described. Where possible reference will be made to the accompanying drawings and where possible using reference numerals in the drawings. It shall be noted however that the drawings are exemplary embodiments only and other features and embodiments may well be within the scope of the invention as described.

In the following description it will be adhered to the definitions below:
   Cashier, by a cashier it is meant any person that operates the checkout counter and is responsible for the cashier terminal during expedition of customer goods as well as control of payment and end of sale, EOS.
   Customer, the customer shall be interpreted as any person which have the intention of purchasing goods and which brings the goods to a checkout counter according to the present invention. According to the present invention numerous customers can operate the dual checkout counter according to the present invention. The customers are denoted according to if they are positioned at the right-hand side loading area 101a or the left-hand side loading area 101b, i.e. right-hand and left-hand customer etc.

Indicated directions are defined as seen from the view of the cashier while he faces the loading areas 101.

Checkout counter, and counter is used interchangeably throughout the description. The terms shall be understood as the complete check out area for checking out goods this includes the loading area, the registration area including any cash register and the packing area. The checkout counter according to the present invention is a dual checkout counter, which means that at least one customer and one cashier can operate the checkout counter simultaneously and there is at least three registration means one for the cashier, one for the right-hand side customers and one for the left-hand side customers.

Scale, by scale it shall be understood any scale being a part of a checkout counter which is configured for weighing goods that shall be checked out by the checkout counter. Any input from these are read into a computer system and registered into the appropriate zone according to the computer system state and logic.

Registration means, by registration means it shall be understood any means adapted to register goods. Typical examples include bar code scanners, RFID-readers or optical/visual recognition devices. The registration means may be configured to scan/register goods in a plurality of direction; this can be facilitated by using a rotating scanning head, RFID-reader and/or optical registration unit(s). Any input from these are read into a computer system and registered into the appropriate zone according to the computer system state and logic.

Loading area, the loading area is defined as the area in which customers place goods to be purchased.

Packing zone barrier sensors/activators: The computer system may execute operational control from knowing the position of the barriers at any time of the processing. The sensors may through the means of known technology like magnetic switches, micro switches, optical sensors or other means detect if a barrier is present in a sensor position, what barrier is present or if it has been moved passed the sensor position and then in what direction.

Motion sensor: The motion sensors according to the present invention can be based on light, laser beams, photo barriers among others. The sensors can be provided as one of or a combination of (dual technology motion detectors or multi-technology motion detectors), Passive infrared sensors, Microwave detection sensors, Ultrasonic sensors, Tomographic motion detector or Video camera software.

Figure 8:
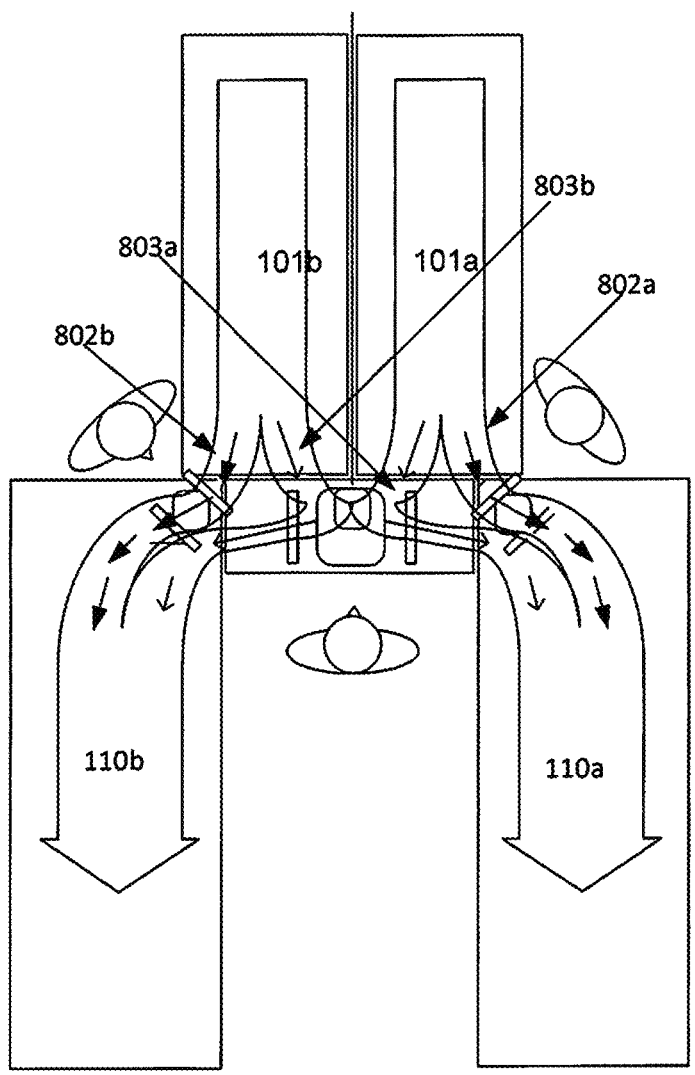
FIG. 8 shows left and right-hand side streams of goods downstream for a dual checkout counter.

The present invention comprises a dual checkout counter 100, which may register goods for one or two customers 105a, 105b simultaneously or approximately simultaneously and independent of each other. The dual checkout counter 100 provides two parallel loading areas 101a, 101b one for a left-hand customer 105b and one for a right-hand customer 105a. Furthermore the dual checkout counter 100 comprises registration zones for goods for right-hand side customer 105a, left-hand side customer 105b as well as for the cashier 104. Registration of goods can be open for the left-hand side and the right-hand side simultaneously, which make it possible for the cashier 104 to register goods for the left-hand side customer 105b and the right-hand side customer 105a interchangeably without any interruption in the registration of any of the customers. As is shown in FIG. 8 the dual checkout counter can manage two flows of goods downstream from the loading areas 101a, 101b. At the bottom of the loading areas it is provided registration zones for the customers 105a, 105b and the cashier 104. The right-hand flow can be split into two flows 802a, 803a, the same applies for the left-hand flow of goods. Splitting is not automatic or induced by the dual checkout counter, rather it is the result of the cashier 104 and the right-hand side customer 105a picking goods downstream from the loading area 101a, thereby creating two flows of goods for registration on the right-hand side. The same applies to the left-hand side as the cashier 104 is free to pick goods arriving from the left 101b and right-hand side 101a loading areas independently of each other. When goods arrives in front of the customers 105a, 105b they can start scanning goods from their respective flow of goods on their dedicated registration means 245a, 245b. The cashier 104 can register goods from the right-hand side 803a and the left-hand side 803b. After registration the cashier 104 will forward the goods to the appropriate side downstream of his registration means 140. Goods from the right-hand side to the right-hand side and goods picked from the left-hand side downstream on the left-hand side to the left-hand side packing area 110b.

The loading areas 101 may comprise two conveyor belts one for the right-hand side 101a and one for the left-hand side 101b. Goods can be loaded by one or more customers 105a, 105b simultaneously. The right-hand side loading area 101a and the left side loading area 101b according to FIGS. 2, 3, 4 and 8 is designed to let customers on each loading area face each other. A separator wall 211 divides the right-hand loading area 101a from the left-hand side loading area 101b, hence separating goods in the two areas. The length of the conveyor belts of the loading areas 101 can be adapted for one or more customers loading goods simultaneously on the same side, i.e. the longer the belt the more customers 105a, 105b.

Figure 11:
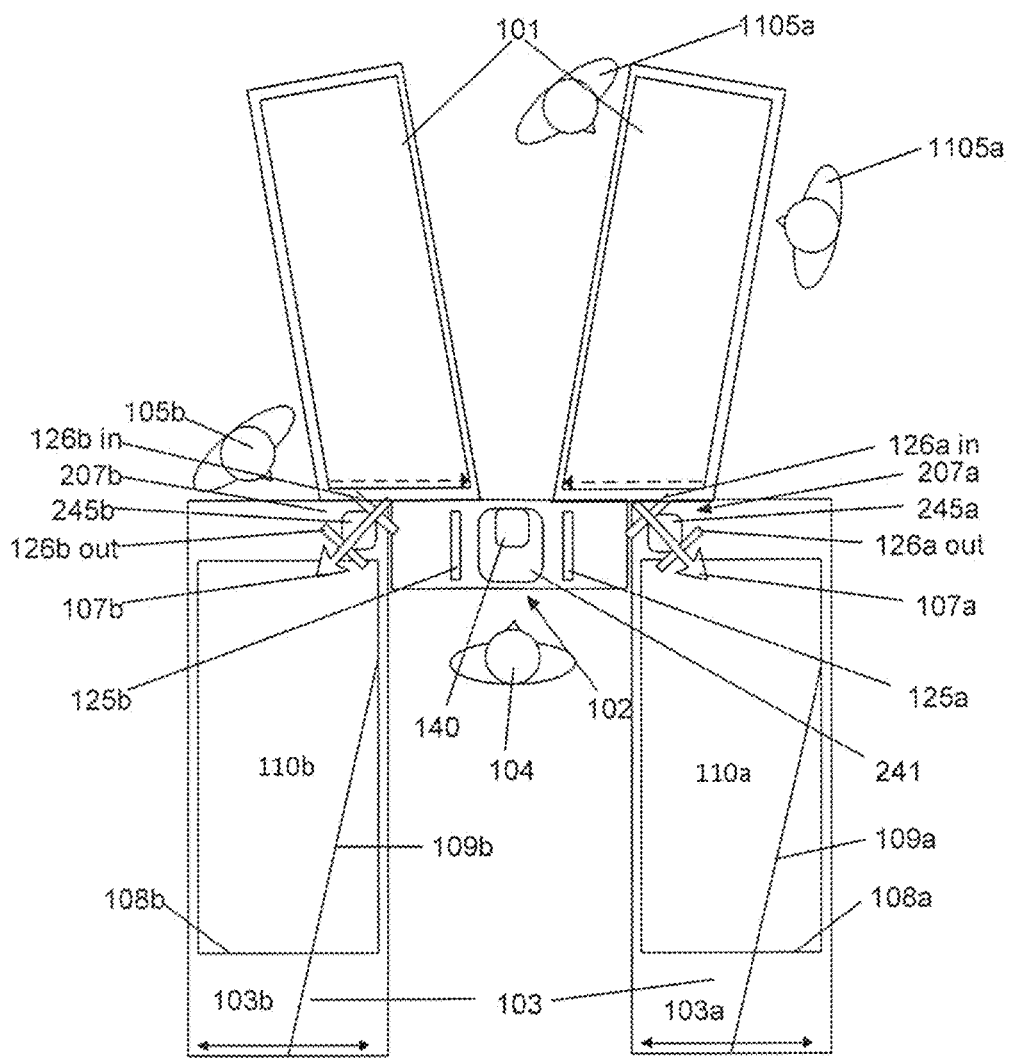
FIG. 11 shows a dual checkout counter with a different loading area layout.

In one embodiment the loading areas 101a, 101b can be physically separated as each loading area can be materialised as individual desks, ref FIG. 11. In FIG. 11, it is indicated two customers 1105a loading goods to the right-hand side loading area. It shall be appreciated that the configuration of the loading areas, i.e. loading desks and packing areas, i.e. packing desks can have different configurations. The major principle shall none the less be intact as a flexible registration of goods independent and simultaneously between left and right-hand side shall be facilitated while a cashier 104 shall be able to register goods from the left and right-hand side interchangeably and independent of each other. Correct registration is facilitated by motion sensors. It can be possible to manually overrun the indication from the motion sensors.

Photo cells 106a, 106b can be arranged downstream of the loading area 101 conveyor belts, close to the registering area. The photo cells 106a, 106b detects goods on the belt and controls feeding of goods to the conveyor belts. Cashier 104 and/or customer 105, 105a, 105b may also control the start and stop of the respective loading belts using controls/control switches or the data system of the checkout counter.

Figure 2:
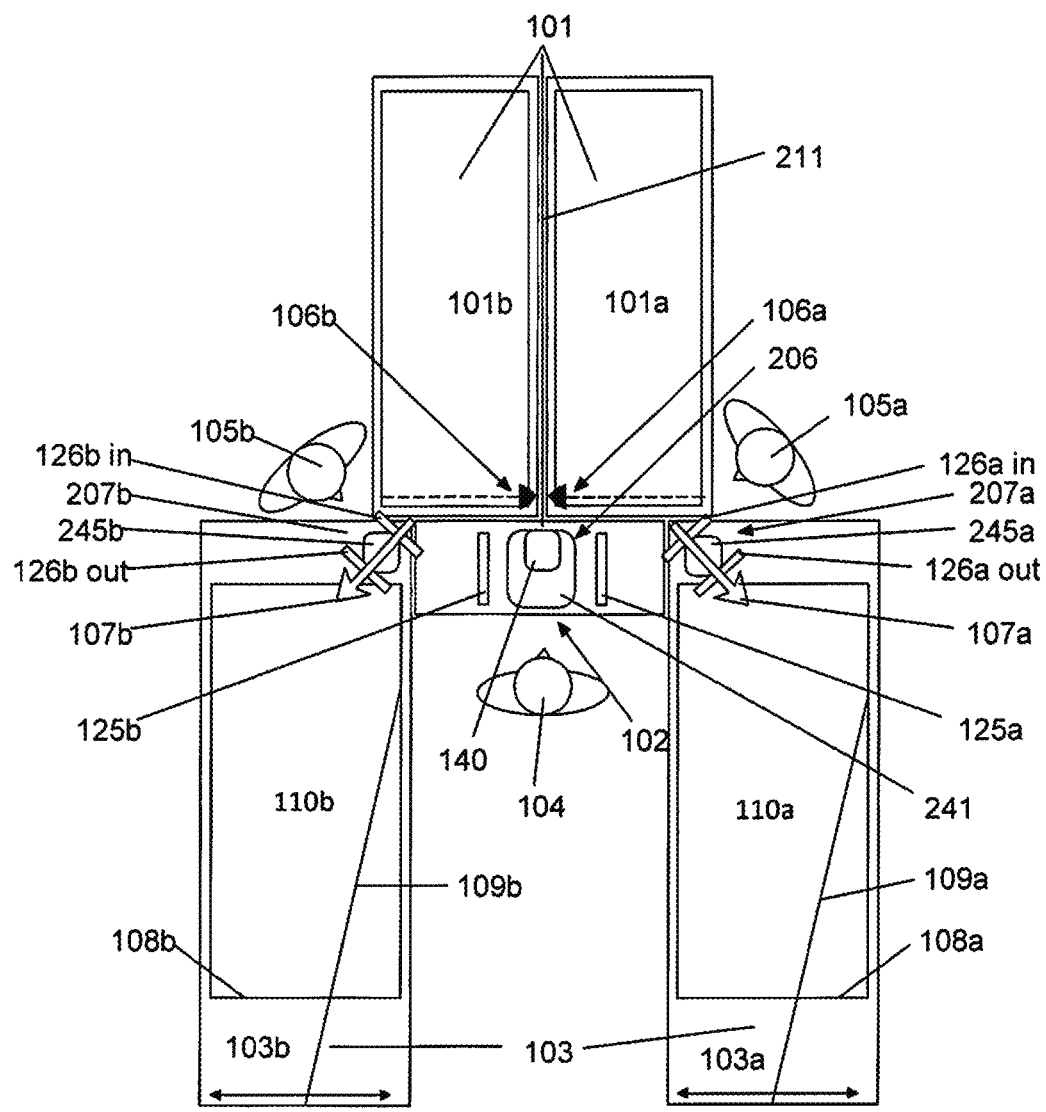
FIG. 2 shows a dual checkout counter with motion sensors.
Figure 3:
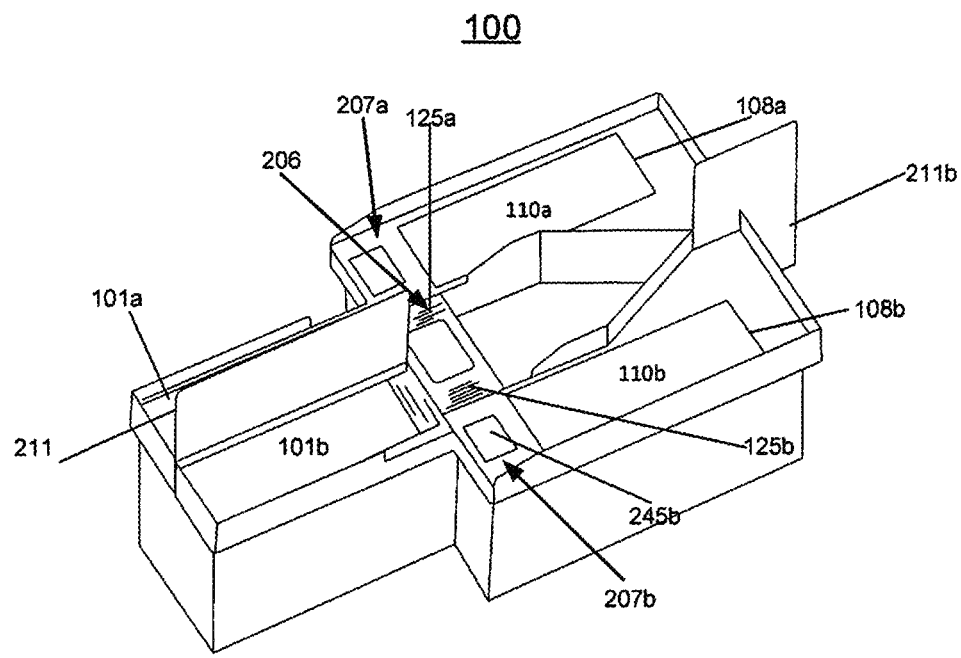
FIG. 3 shows a dual checkout counter in perspective.
Figure 4:
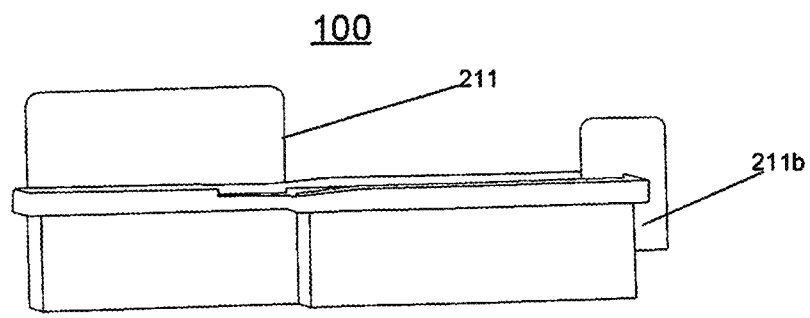
FIG. 4 shows a dual checkout counter in perspective

From the loading areas 101 goods are fed independently from the right-hand side and the left-hand side to a cashier registering/scanning zone 206. The registration means 140 and optionally a scale 241 controlled by the cashier 104 is arranged in the cashier registering/scanning zone 206. The scale 241 and the registering means 140 may be separate standalone units or scale 241 and registering means may be combined in one single unit. Goods may be pushed out from the cashier registering/scanning zone 206 to the right or left in the direction of the packing areas, ref. FIGS. 2, 3, 4, 8 and 11. To facilitate moving goods the cashier registering/scanning zone 206 may be provided with rollers. A motion detector on the right-hand side 125a and on the left-hand side 125b of the registering area 206 is shown in FIG. 2. It is imperative that goods registered by the cashier 104 is registered to the correct customer, this is facilitated by the mentioned motion detectors. For instance, if the cashier picks up a commodity from the right-hand side, the right-hand side cashier stream 803a, his arms will move out into the cashier flow 803 to pick up a commodity and back to his registration means 140, succeeding the registration the cashier 104 will place the registered commodity in the downstream flow towards the right-hand side packing area 103a, when doing so the arm of the cashier will pass the right-hand side sensor/motion detector 125a, this will indicate a right-hand side registration and the registration will be added to the bill of the right-hand side customer 105a. The same motion recognition process applies for the left-hand side. The cashier 104 may overrule/indicate which sale, right or left, a registration is valid for, this may be carried out by a manual control or via the data system of the checkout counter.

To secure safe registration an algorithm having as input the output of the cashier motion detectors 125a, 125b is provided. The principle is that impossible registrations such as simultaneously detection on the right and left-hand side for the same goods is not permissible and implies manual registration. That is, the cashier 104 decides whether goods shall be registered to the left-hand side customer 105b or the right-hand side customer 105a. The logic/algorithm is disclosed in table 1 below.

TABLE 1

| Right movement/direction | | Left movement/direction | | |
|---|---|---|---|---|
| Cashier Pick | Cashier deliver | Cashier Pick | Cashier deliver | Customer to be registered |
| 0 | 0 | 0 | 0 | No registration |
| 0 | 0 | 0 | 1 | Left |
| 0 | 0 | 1 | 0 | Left |
| 0 | 0 | 1 | 1 | Left |
| 0 | 1 | 0 | 0 | Right |
| 0 | 1 | 0 | 1 | Manual |
| 0 | 1 | 1 | 0 | Manual |
| 0 | 1 | 1 | 1 | Left |
| 1 | 0 | 0 | 0 | Right |
| 1 | 0 | 0 | 1 | Manual |
| 1 | 0 | 1 | 0 | Manual |
| 1 | 0 | 1 | 1 | Left |
| 1 | 1 | 0 | 0 | Right |
| 1 | 1 | 0 | 1 | Right |
| 1 | 1 | 1 | 0 | Right |
| 1 | 1 | 1 | 1 | Manual |

On each side diagonally from the cashier 104 one or two customers 105a 105b may use their own customer dedicated registration means 245a, 245b. Each registration means 245a, 245b is connected to the data system of the checkout counter and registration is automatically handled and invoiced to the correct customer 105a, 105b depending on which side the registration takes place. That is, registration by the customer right-hand registration means 245a will result in goods being invoiced to the right-hand customer 105a. Each of the registration means 140, 245a, 245b are connected to the data system of the checkout counter where registration is automatically done and where the relevant purchase is mapped to the correct side where registration took place.

Erroneous registration of goods at checkout counters can be a problem. Customers may deliberately or by accident cover codes to be registered, such as bar codes, QR-codes or other "visual" codes. Double registration may also occur etc.

The motion detecting means 125a, 125b, 126a_in, 126a_out, 126b_in, 126b_out which have the ability to sense motion of arms and/or hands can provide additional certainty when scanning/registering goods at a checkout counter.

Figure 10:
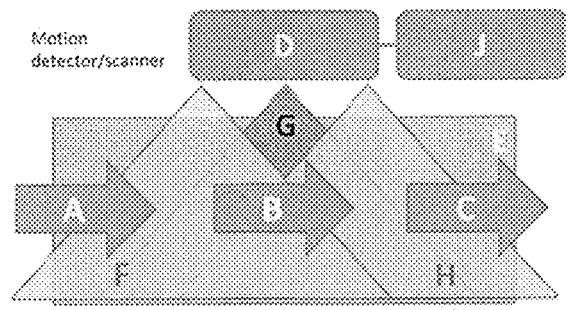
FIG. 10 shows a schematic and principle view of motion detection.

Motion recognition can be an integral part of the registration means, registration means such as optical scanners may be configured to additionally detect motion. The registration means and the motion sensors may be based on different technology, but still be housed within the same cabinet/housing. Motion recognition/detection/scanning can be effected by photographic analysis, measurement of returned light etc. The movement direction may also be determined by the motion detectors. With reference to FIG. 10, the area marked as "D" in the figure indicates a combined scanner and two laser/light rays ("F" and "H") for motion detection.

For illustrative purposes a scanning beam for registering goods is labelled "G" the combined scanning device (registration means) and motion detector, is marked "D". As is illustrated in among others FIGS. 2, 3, and 11 the motion detectors 125a, 125b, 126a_in, 126a_out, 126b_in, 126b_out can be separate from the registration means moreover the checkout counter may include one, two or more separate motion detecting means.

A restricted area within the registration areas of a checkout counter 100 is, suitable for the detection of motion. An example of such an area is indicated as E in FIG. 10, whereas all registration areas are shown in FIGS. 2 and 11 can be suitable for motion detection. The motion detection area can be found immediately before any common barcode reader/goods registration means or near another item detection unit.

Upon detection of a motion indicating that an item is moved through the detection area E, the system will check that a commodity detection have been carried out and registration of goods between the entrance to the detection area marked "A" and the exit of the detection area indicated by the arrow marked "C". The control can alternatively be carried out using one or more sensors, where aggregate information regarding motion/movement and identification/registration of goods are compared or grouped together so as to reveal whether goods are registered correctly or an item is moved past the registration zone without being registered.

A signal indicating the status of registration can be provided using light signals, audio signals and/or the registration status is transferred to other systems (payment station/system), so that the customer and/or cashier and/or other required recipients of the information can access it.

The registration area 206 can be built up with one or two roller paths or conveyor belts. These may be operating freely or synchronously between the customer and cashier. Any feed mechanism may be controlled manually or via a computer system, typically referred to as the Point Of Sale (POS) system.

The registration area 206 is designed to transmit item registrations from left and right-hand side into each of their ongoing purchase registrations, into a POS system or in such a way that one or more customers can be in a payment queue after they are completely registered. This enables the registration process to continue with one or more outstanding payments related to purchases in the packing area.

According to the present invention each of the customer operated registration means 245a, 245b can be provided with motion detectors 126a_in, 126a_out, 126b_in, 126b_out, verifying that a valid registration has been carried out by sensing that goods, a hand or goods and a hand is moved in the direction of the packing area 103a, 103b. Upon detection of a motion indicating that an item is moved through the registration area 207a, 207b, the system will check that a commodity detection have been carried out and registration of goods between the entrance 126a_in, 126b_in to the registration means 245a, 245b and the exit of the registration areas 207a, 207b indicated by the arrow 107a, 107b.

Examples of detection areas is indicated by rectangles in FIG. 2, on the right-hand side there is arranged a entrance motion detector 126a_in, which detects movements towards the registration means 245a on the right-hand side, moreover there is arranged a second right-hand side exit motion detector 126a_out, downstream of the registration right-hand side registration means 245a, a corresponding arrangement is provided for the left-hand customer 105b, i.e. a first left-hand motion detector 126b_in and a second left-hand motion detector 126b_out downstream of the first left-hand motion detector 126b_in. The customer 105a, 105b registration means 245a, 245b is arranged between the two customer motion detectors on either side. The arrow on either customer side indicates the moving direction of goods to be purchased. The motional areas of the registration means are arranged to not interfere with the registration areas 206 of the cashier 104, so that handling of goods by the cashier 104 does not interfere with the customers 105a, 105b handling of goods and vice versa.

As an example adding goods to sale on the right-hand side can be carried out as follows:

Commodities is picked by the right-hand side customer 105a from the bottom of the loading area 101a. Commodity is then detected by the right-hand side entrance motion detector 126a_in, thereafter the commodity is scanned and registered by the registration means 245a and finally the commodity is moved downstream passing the right-hand side exit motion detector 126a_out. Logically the registration and sale process can be as indicated in table 2.

TABLE 2

| Sensors<br>Reg.<br>means | State<br>(Sale = true) |
|---|---|
| 126a_in | True |
| 245a | True |
| 126a_out | True |

The same process applies for the left-hand side.

Obviously, it is very strict to require that in and out sensors both shall be true together with a registration from the registration means 245a. By true it is meant that a detection or a registration has been made by the appropriate sensor or registration means.

In one embodiment it is only provided one entrance motion detector on the right and the left side, this leads to the situation in table 3.

TABLE 3

| Sensors<br>Reg.<br>means | State<br>(Sale = true) |
|---|---|
| 126a_in | True |
| 245a | True |

According to this embodiment the same applies to the left-hand side.

Yet another embodiment may only include an exit motion sensor, which leads to the following situation:

TABLE 4

| Sensors<br>Reg.<br>means | State<br>(Sale = true) |
|---|---|
| 245a | True |
| 126a_out | True |

It shall be appreciated that inclusion of the entrance 126a_in, 126b_in and exit 126a_out, 126b_out motion detectors does not exclude the possibilities to only use one of the detector on each side in the registration process, this is a matter of software configuration. Also only using the registration means 245 to indicate a sale can be possible.

The table below indicates the possible registration states on the right-hand side, the same logic applies to the left-hand side.

| Item | 126a_in | 126a_out | 245a | Valid sale |
|---|---|---|---|---|
| a) | 0 | 0 | 0 | No |
| b) | 0 | 0 | 1 | Yes, dependent on algorithm |
| c) | 0 | 1 | 0 | No |
| d) | 0 | 1 | 1 | Yes, dependent on algorithm |
| e) | 1 | 0 | 0 | No |
| f) | 1 | 0 | 1 | Yes, dependent on algorithm |
| g) | 1 | 1 | 0 | No |
| h) | 1 | 1 | 1 | Yes |

Further to the items above, item a will never indicate a valid sale. Item b, d and f may indicate valid sale dependent on the software configuration i.e. the algorithm for determination of a valid sale. Item h will always indicate a sale, independent of the algorithm used as long as one entrance motion sensor, one registration means and one exit motion sensor as it is disclosed in FIG. 2 is present.

As is evident from the above it is a matter of software configuration whether all of a, b, d, f and h shall be considered as valid sales or not. The remaining items can obviously not be considered valid sale and shall imply some sort of manual action and/or trig alarms.

Two packing areas, one on the left side and one on the right-hand side, is arranged downstream of the customer registration areas 207a, 207b. Optional feeding conveyors 110a, 110 b may be provided to facilitate transport of good from the customer registration areas 207a, 207b to the respective packing areas 103a, 103b. One or more packing zone barriers 109a, 109b can be arranged between the downstream end of the packing area and the areas proximate to the customer registration areas 207a, 207b. In one embodiment the packing areas can be of the turntable type, ref FIG. 3.

A signal indicating the status of registration can be provided using light signals, audio signals and/or the registration status is transferred to other systems (payment station/system), so that the customers 105a, 105b and/or cashier 104 and/or other required recipients of the information can access it.

In one embodiment the customers 105a, 105b can get a red light at the erroneous/missing registration and cashier gets a notice of the same on his screen. Correspondingly a correct registration can trig a green light and the item shows up in the payment system as being correctly registered. Obviously indication of erroneous registration and correct registration may be indicated differently from what is mentioned above, the goal is to indicate erroneous and correct registration in a manner which can be handled by the operators of the registrations means, such as the cashier 104.

As indicated above the checkout counter can be fitted with one or two turntable packing areas 103, which allows for multiple purchases to accumulate in zones 208 according to the output from the registration area 102. The turntable packing area 103 may have zones 208 of varying/flexible size in order to be adaptable to varying package volumes per purchase. Any feed mechanism may be controlled manually or via a computer system, typically referred to as the Point Of Sale (POS) system. Different layout of engagement between the customer registration areas 207a, 207b and turntable packing areas will be described below.

Registration Flow in Detail

Figure 9:
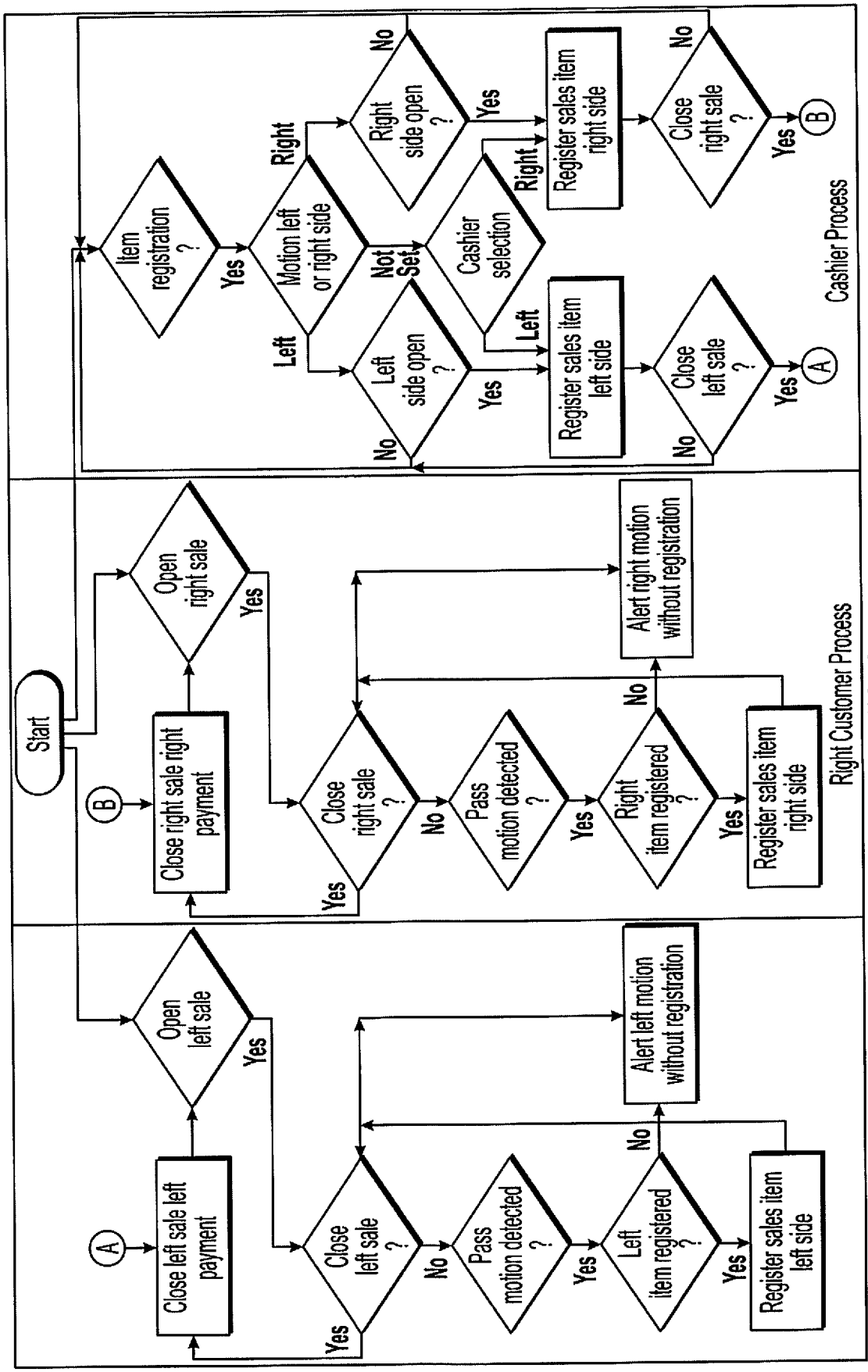
FIG. 9 shows a registration flow chart for a dual checkout counter

Step by step the process of registering goods with the dual checkout counter is illustrated in FIG. 9. Initially a previous sale must have been closed before a new can commence on the same side. However registration may be open on one side and closed on the other. First for the sake of simplicity a right-hand side sale will be described from opening till closing of the sale. When a first commodity in a new sale arrives at the bottom of the loading area 101a or is detected by the photo sensors 106a two scenarios are possible, the first commodity is registered by the cashier 104 or the first commodity is registered by the right-hand side customer 105a, dependent on who is picking the first commodity. Firstly registration by the cashier is described. The cashier 104 picks the first commodity for scanning from the bottom of the right-hand side loading area 101a. His hand movement is detected, this is indicated in the table above as an active "Right-hand Cashier Pick=1". The commodity is moved to the scanner/registration means 140. The commodity will be registered, however the registration will be temporarily stored before registration to one particular customer is carried out. After registration the next step is the motion detecting "Cashier deliver" step indicated as "Right-hand Cashier Deliver" in the table 1. In this example the cashier 104 moves the commodity over the right-hand side motion detector 125a indicating a movement to the right, i.e. "Cashier deliver right-hand side is a logical "1". This is indicated in the flowchart by the box "Motion Left or Right side". In this example it is "Motion Right side" and the intermediate registration is carried to the right-hand side customer 105a provided that right-hand side is open. It can be closed due to errors or due to the fact that the previous right-hand side customer has yet not settled his bill. In this example the previous customer has finished and the right side is open. Having registered the commodity to the right-hand side customer the cashier may commence registering goods, ref. the lowermost box ""Close Right Sale?" yes or no". If there are more goods to register on the right-hand side the cashier may repeat the registration process for new goods, indicated by the "No" choice at the lowermost box. If there isn't the cashier may close the sale on the right side. This is indicated as "route" B in the flow chart. The right-hand side customer 105a can make his registrations independent of the cashiers' 104 registrations, provided that sale is open.

The scenario where first commodity is picked by the right-hand side customer 105a will now be described. Initially a previous sale must have been closed before a new can commence on the same side. The right-hand side customer 105a picks the first commodity for scanning from the bottom of the right-hand side loading area 101a. This is shown as the right most stream 802a where the downstream of goods is split shown in FIG. 8. The commodity is moved by the right-hand side customer 105a over the motion detector 126a_in. If the previous sale has been closed sale will be open this is illustrated with the box "Open Right Sale" "the Yes option" in FIG. 9. Following the motion detecting step the next step is registration of the first commodity. The first commodity is scanned by the right-hand side customer 105a using the scanning means 245a. After registration the next step is a motion detecting step. In this example the right-hand side customer 105a moves the commodity over the right motion detector 126a_out indicating a movement to the right and downward in the direction of the right-hand side packing area. Having registered the first commodity to the right-hand side customer 105a the right-hand side customer 105a may commence registering goods, ref. the lowermost box "Register Sales Item Right Side" followed by ""Close Right Sale?" yes or no". If there are more goods to register on the right-hand side the right-hand customer 105a may repeat the registration process for new goods, indicated by the "No" choice in the "Close Right Sale" box. If there isn't the sale on the right side will be closed indicated by the box "Close Right Sale Right Payment".

The left-hand side customer 105b registration process is similar to that of the right-hand side customer 105a.

The sale process described above is described as two individual processes for the sake of clarity, in real life situations goods can be registered in parallel by the customers 105a, 105b and the cashier. The cashier 104 may pick goods from the right-hand side downstream 803a as well as from the left-hand side downstream 803b as long as left and right-hand sale is open. The right 105a and the left-hand side customers 105b operate independent of each other. That is, sale can continue on one side irrespectively of the state at the other side.

Erroneous registration of goods at checkout counters is a problem. Customers may deliberately or by accident cover codes to be registered, such as bar codes, QR-codes or other "visual" codes. Double registration may also occur etc.

Means which have the ability to sense motion of arms and/or hands can provide additional certainty when scanning/registering goods at a checkout counter.

Motion recognition can be an integral part of the registration means, registration means such as optical scanners may be configured to additionally detect motion. The registration means and the motion sensors may be based on different technology, but still be housed within the same cabinet/housing. Motion recognition/detection/scanning can be effected by photographic analysis, measurement of returned light in the divided zones, in that one or more photo barriers wrap or similar methods commonly known for detecting a movement beyond a point or region. The movement direction may also be determined by the motion detectors.

EMBODIMENTS OF THE INVENTION

First Embodiment of the Packing Area

Figure 5:
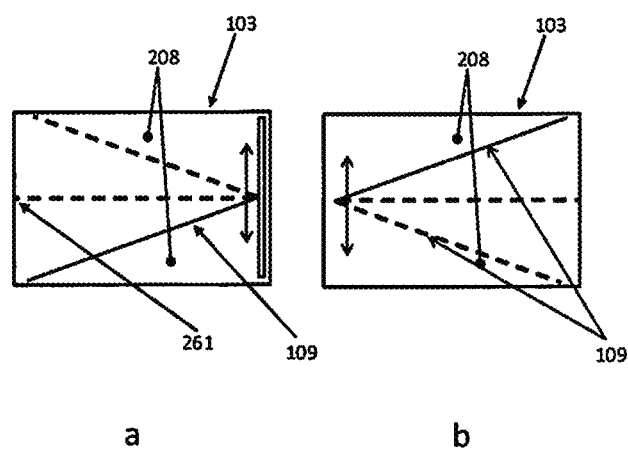
FIG. 5 shows two embodiments of packing areas.

The first embodiment FIG. 5a, 5b of the packing area discloses two packing areas 103 of a checkout counter one for the right-hand side and one for the left-hand side. This embodiment is often referred to as a standard packing area. The packing areas according to this embodiment is designed as rectangles. Each packing area comprises one barrier 109 pivotably arranged at the centre or substantially in the centre of one end of the packing area. The barrier is adapted to divide the packing area into two zones, where the border of the zones will depend on the position of the barrier. Typically the barrier may be moved between two or three positions which will give two or three different configured packing zones for the barrier pivotably connected to the remote end of the packing area (FIG. 5a) and two or three for a barrier connected to the near side (FIG. 5b) of the packing area respectively. The nearside of the packing area is the part of the packing area which is adjacent to the registration area 207a, 207b, and the remote end of the packing area is the end which is farthest from the registration area.

In one embodiment a plurality of barriers 109 may be provided, with pivot axis adjacent each other in a line, this may provide more than two packing zones. The number of packing zones will depend on the number of barriers 109.

Second Embodiment of the Packing Area

Figure 6:
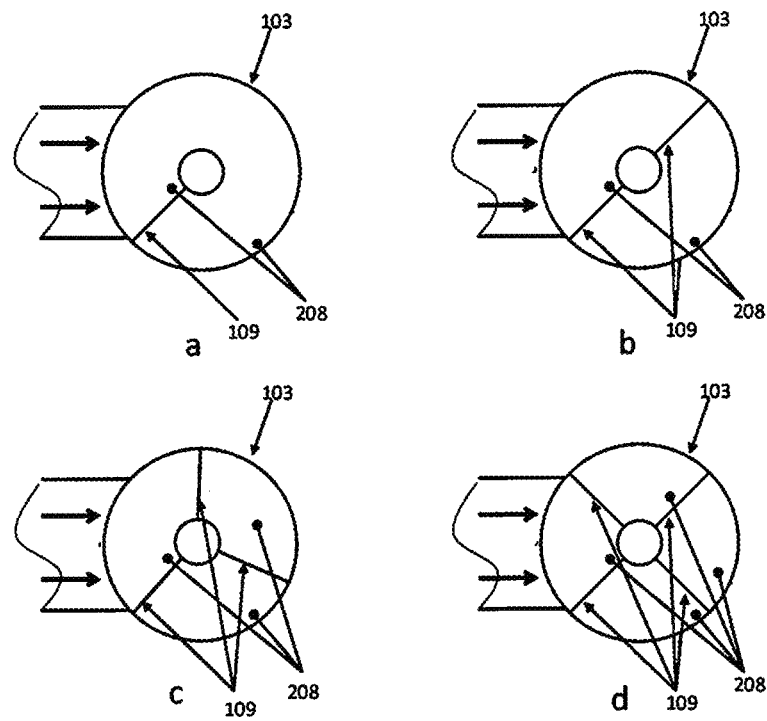
FIG. 6 shows four embodiments of packing areas.
Figure 7:
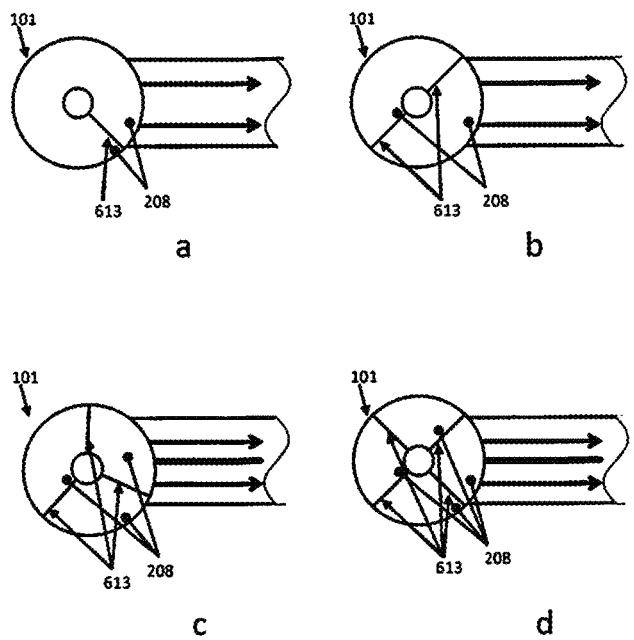
FIG. 7 shows four embodiments of loading areas.

The second embodiment of the invention (ref. FIG. 6) discloses two packing areas, one right-hand side and one left-hand side, including a rotatable disc a so called turntable packing area arranged with one barrier 109 arranged radially from the centre or proximately to the centre of the disc. The one barrier 109 is adapted to rotate synchronously and/or together with the rotatable disc as well as independently of the disc around its axis of rotation i.e. the centre or proximately the centre of the disc.

Third Embodiment of the Packing Area

The third embodiment (FIG. 6b) of the packing area discloses two identical packing areas 103 one right-hand side and one left-hand side including a rotatable disc arranged with two barriers 109 arranged radially from the centre or proximately to the centre of the disc where the two barriers 109 is adapted to rotate synchronously and/or together with the rotatable disc as well as independently of the disc around its axis of rotation i.e. the centre or proximately the centre of the disc. According to one aspect of the second embodiment of the packing area the two barriers 109 are parallel and arranged radially from the centre or proximate to the centre of the disc in opposite directions.

Fourth Embodiment of the Packing Area

The fourth embodiment (FIG. 6c) of the packing area discloses two identical packing areas 103 one right-hand side and one left-hand side including a rotatable disc arranged with three barriers 109 arranged radially from the centre or proximately to the centre of the disc where the three barriers 109 is adapted to rotate synchronously and/or together with the rotatable disc as well as independently of the disc around its axis of rotation i.e. the centre or proximately the centre of the disc. The angle between the barriers 109 will typically be 120°.

Fifth Embodiment of the Packing Area

The fifth embodiment (FIG. 6d) of the packing area discloses two identical packing areas 103 one right-hand side and one left-hand side including a rotatable disc arranged with four barriers 109 arranged radially from the centre or proximately to the centre of the disc where the four barriers 109 is adapted to rotate synchronously and/or together with the rotatable disc as well as independently of the disc around its axis of rotation i.e. the centre or proximately the centre of the disc. The angle between the barriers 109 will typically be 90°. However, according to aspects of the fourth embodiment the angle between barriers may vary as the barriers may move independently of the rotatable disc and hence the angle between adjacent barriers may vary. A solution with four barriers may for example include the angles 180°, 60°, 60° and 60°. Hence the angle between to neighbouring barriers may be 180° or 60°.

The person skilled in the art will realise that the number of barriers may exceed four.

A First Embodiment of the Loading Area

According to a first embodiment (FIG. 2, 3, 4, 8) of loading areas 101, the loading areas comprises a left 101b and right-hand loading area 101a.

The loading areas may be provided with rollers or one or two conveyor belts.

The loading area may also only include a simple smooth surface.

A Second Embodiment of the Loading Area

According to a second embodiment (FIG. 7a-d) of the loading areas 101, the left-hand side and right-hands side loading areas are provided with one disc which resembles that of the second (FIG. 6a), third (FIG. 6b), fourth (FIG. 6c) and fifth (FIG. 6d) embodiment of the packing area. The turntable disc will be upstream of the registration area of the cashier 104, typically the turntable area will be followed by two parallel transport zones downstream, one for the right-hand customer 105a and one for the left-hand customer 105b. The turntable loading area may also be provided as a disc without any barrier.

According to one aspect of the second embodiment of the loading area the barriers are pivotably movable around its axis of rotation independent of the disc. Moreover, as further discussed elsewhere the barriers may be provided with sensors and the turntable with activators which are configured to interact with the barriers so as to facilitate or prevent movement of the barriers 613 and/or the roundtable disc.

The person skilled in the art will realise that configurations with a number of barriers as described with respect to the packing area may also be utilised for the loading area.

Configurations with two turntable loading areas feeding two independent transport zones downstream to the right 105a and left-hand customer 105b is possible. Moreover, the packing areas may be provided as one single turntable disc area fed by two independent conveyors downstream from the customers' registration areas 207a, 207b.

REFERENCE NUMBERS, MAPPING LIST

| | |
|---|---|
| 101: | Loading area |
| 101a | Right-hand side loading area |
| 101b | Left-hand side loading area |
| 102: | Registering/scanning area |
| 103: | Packing area |
| 103a | Packing area, right-hand side |
| 103b | Packing area, left-hand side |
| 503 | Packing area |
| 104: | Cashier |
| 105: | Customer performing registering/scanning |
| 105a | Customer right-hand side |
| 105b | Customer left-hand side |
| 106 | Photo cells |
| 106a | Photo cells right-hand side |
| 106b | Photo cells left-hand side |
| 107a | Moving direction |
| 107b | Moving direction |
| 108a | End of conveyor belt right-hand side |
| 108b | End of conveyor belt left-hand side |
| 206: | Cashier registering/scanning zone |
| 207: | Customer registering/scanning zone |
| 207a | Customer registering/scanning zone, right-hand side |
| 207b | Customer registering/scanning zone, left-hand side |
| 208: | Packing zone(s) |
| 109 | Packing zone barriers |
| 109a: | Packing zone barriers right-hand side |
| 109b | Packing zone barriers left-hand side |
| 211: | Separator wall |
| 125 | Motion detecting means |
| 125a | Motion detecting means cashier right-hand side |
| 125b | Motion detecting means cashier left-hand side |
| 126a | Motion detecting means, customer right-hand side |
| 126b | Motion detecting means, customer left-hand side |
| 140: | Cashier operated barcode scanner, i.e. registration means |
| 241: | Cashier operated scale |
| 245a: | Customer operated barcode scanner, (registration means) right-hand side |
| 245b | Customer operated barcode scanner, (registration means) left-hand side |
| 246: | Customer operated scale |
| 613 | Loading zone barriers |
| 802a | Commodity flow right-hand customer 105a |
| 802b | Commodity flow left-hand customer 105b |
| 803a | Commodity flow cashier downstream right-hand side |
| 803b | Commodity flow cashier downstream left-hand side |
| 1105a | Right-hand side customers loading goods to the right-hand side loading area 101a |

The invention claimed is:

1. A commodity registration system comprising:
one right-hand side commodity registration system;
one left-hand side commodity registration system;
a combined right-hand side and left-hand side commodity registration system, wherein the one right-hand side commodity registration system is independent of the one left-hand side commodity registration system and the combined right-hand side and left-hand side commodity registration system is associated with both the one right-hand side commodity registration system and the one left-hand side commodity registration system in one checkout counter;
a right-hand side registration means associated with the one right-hand side commodity registration system and having a computer interface;
a left-hand side registration means associated with the left-hand side commodity registration system and having a computer interface;
a cashier registration means arranged between the right-hand side registration means and the left-hand side registration means and having a computer interface associated with the combined right-hand side and left-hand side commodity registration system;
a right-hand side motion detector associated with the one right-hand side commodity registration system, the right-hand side motion detector having a computer interface; and
a left-hand side motion detector associated with the one left-hand side commodity registration system, the left-hand side motion detector having a computer interface.

2. The commodity registration system according to claim 1, where the right-hand side motion detector is configured to transmit a "true" signal to the computer if a hand movement and/or commodity movement is sensed by the right-hand side motion detector and the left-hand side motion detector is configured to transmit a "true" signal to the computer if a hand movement and/or commodity movement is sensed by the left-hand side motion detector.

3. The commodity registration system according to claim 1, where the right-hand side motion detector is configured to transmit a "true" signal to the computer if a hand movement and/or commodity movement is sensed by the right-hand side motion detector, and the left-hand side motion detector is configured to transmit a "true" signal to the computer if a hand movement and/or commodity movement is sensed by the left-hand side motion detector.

4. The commodity registration system according to claim 1, further comprising a computer including a computer program configured to determine whether a correct registration of commodities has taken place.

5. The commodity registration system according to claim 4, where the computer program is configured to execute the following conditional test:
   a. the right-hand side motion detector="true";
   b. the one right-hand side commodity registration system="true"; and
   c. the right-hand side motion detector="true", wherein if tests a-c are true then the computer program is configured to set registration of commodities="true".

6. The commodity registration system according to claim 4, where the computer program is configured to execute the following conditional test:
   d. the left-hand side motion detector="true";
   e. the one left-hand side commodity registration system="true"; and
   f. the left-hand side motion detector="true", wherein if tests d-f are true then the computer program is configured to set registration of commodities="true".

7. The commodity registration system according to claim 4, where the computer program is configured to execute the following conditional test:
   g. the right-hand side motion detector="true"; and
   h. the one right-hand side commodity registration system="true", wherein if tests g and h are true then the computer program is configured to set registration of commodities="true".

8. The commodity registration system according to claim 4, where the computer program is configured to execute the following conditional test:
   i. the left-hand side motion detector="true"; and
   j. the one left-hand side commodity registration system="true", wherein if tests i and j are true then the computer program is configured to set registration of commodities="true".

9. The commodity registration system according to claim 4, where the computer program is configured to execute the following conditional test:
   k. the one right-hand side commodity registration system="true"; and l. the right/left-hand side motion detector="true", wherein if tests k and l are true then the computer program is configured to set registration of commodities="true".

10. The commodity registration system according to claim 4, where the computer program is configured to execute the following conditional test:
   m. the one right/left-hand side commodity registration system="true"; and
   n. the right/left-hand side motion detector="true", wherein if tests m and n are true then the computer program is configured to set registration of commodities="true".

11. The commodity registration system according to claim 4, where the computer program is configured to test if the one right-hand side commodity registration system="false", and if the one right-hand side commodity registration system="false" the computer program is configured to set registration of commodities="false".

12. The commodity registration system according to claim 4, where the computer program is configured to test if the one left-hand side commodity registration system="false", and if the one left-hand side commodity registration system="false" the computer program is configured to set registration of commodities="false".

13. The commodity registration system according to claim 1, wherein the right-hand side motion detector includes a right-hand side entrance motion detector and a right-hand side exit motion detector, and wherein the left-hand side motion detector includes a left-hand side entrance motion detector and a left-hand side exit motion detector.

14. The commodity registration system according to claim 1, wherein the further comprising at least one cashier associated motion detector arranged between the left-hand side motion detector and the right-hand side motion detector, the at least one cashier associated motion detector including a first motion detector and a second motion detector, the first motion detector being adjacent to the right-hand side motion detector and adjacent to and to the right of the second motion detector, the first and the second motion detectors being associated with the cashier.

15. A cashier commodity registration system in a checkout counter comprising:
   a. a single cashier registration device with an interface with a computer;
   b. a right-hand side motion detector arranged to the right of the cashier registration device with an interface with the computer; and
   c. a left-hand side motion detector arranged to the left of the cashier registration device with an interface with the computer thereby providing a cashier registration system for independent registration of commodities associated with the right-hand side motion detector and commodities associated with the left-hand side motion detector, such that motion by the cashier detected by the right-hand side motion detector causes a good scanned by the single cashier registration device to be registered to a right-hand side registration system, and motion by the cashier detected by the left-hand side motion detector causes a good scanned by the single cashier registration device to be registered to a left-hand side registration system.

16. The cashier commodity registration system according to claim 15, where the right-hand side motion detector is configured to transmit a "true" signal to the computer if a hand movement and/or commodity movement is sensed by the right-hand side motion detector, where the "true" signal is associated with registration of goods from a right-hand side, and the left-hand side motion detector is configured to transmit a "true" signal to the computer if a hand movement and/or commodity movement is sensed by the left-hand side motion detector, where the "true" signal is associated with registration of goods from a left-hand side.

17. The cashier commodity registration system according to claim 15, where the computer includes a computer program configured to determine whether a correct registration of commodities has taken place and if the registration shall be carried to a right-hand side customer or a left-hand side customer.

18. The cashier commodity registration system according to claim 17, where the computer program is configured to execute the following sequential conditional test for determination of correct registration of commodities or not:
   step A: the right-hand side motion detector="true",
   step B: the cashier registration device="true",
   step C: the right-hand side motion detector="true", the computer program configured to correct registration of commodities and registration to be carried to the right-hand side customer in response to executing steps A-C.

19. The cashier commodity registration system according to claim 17, where the computer program is configured to execute the following sequential conditional test for determination of correct registration of commodities or not:
   step D: the right-hand side motion detector="false",
   step E: the cashier registration device="true",
   step F: the right-hand side motion detector="true", the computer program configured to correct registration of commodities and registration to be carried to the right-hand side customer in response to executing steps D-F.

20. The cashier commodity registration system according to claim 17, where the computer program is configured to execute the following sequential conditional test for determination of correct registration of commodities or not:
   step G: the right-hand side motion detector="true",
   step H: the cashier registration device="false",
   step I: the right-hand side motion detector="true", wherein the execution of steps G-I implies no registration of a commodity.

21. The cashier commodity registration system according to claim 17, where the computer program is configured to execute the following sequential conditional test for determination of correct registration of commodities or not:
   step J: the right-hand side motion detector="true",
   step K: the cashier registration device="true",
   step L: the right-hand side motion detector="false", the computer program configured to correct registration of commodities and registration to be carried to the right-hand side customer in response to executing steps J-L.

22. The cashier commodity registration system according to claim 17, where the computer program is configured to execute the following sequential conditional test for determination of correct registration of commodities or not:
   step M: the left-hand side motion detector="true",
   step N: the cashier registration device="true",
   step O: the left-hand side motion detector="true", the computer program configured to correct registration of commodities and registration to be carried to the left-hand side customer in response to executing steps M-O.

23. The cashier commodity registration system according to claim 17, where the computer program is configured to execute the following sequential conditional test for determination of correct registration of commodities or not:
   step P: the left-hand side motion detector="false",
   step Q: the cashier registration device="true", step R: the left-hand side motion detector="true", the computer program configured to correct registration of commodities and registration to be carried to the left-hand side customer in response to executing steps P-R.

24. The cashier commodity registration system according to claim 17, where the computer program is configured to execute the following sequential conditional test for determination of correct registration of commodities or not:
step S: the left-hand side motion detector="true",
step T: the cashier registration device="false",
step U: the left-hand side motion detector="true", wherein the execution of steps S-U implies no registration of a commodity.

25. The cashier commodity registration system according to claim 17, where the computer program is configured to execute the following sequential conditional test for determination of correct registration of commodities or not:
step V: the left-hand side motion detector="true",
step W: the cashier registration device="true",
step X: the left-hand side motion detector="false", the computer program configured to correct registration of commodities and registration to be carried to the left-hand side customer in response to executing steps V-X.

26. The cashier commodity registration system according to claim 17, where the computer program is configured to execute the following sequential conditional test for determination of correct registration of commodities or not:
step Y: the right-hand side motion detector="true",
step Z: the cashier registration device="true",
step A1: the left-hand side motion detector="true", wherein the execution of steps Y, Z, and A1 implies an erroneous registration of commodities.

27. The cashier commodity registration system according to claim 17, where the computer program is configured to execute the following sequential conditional test:
step B1: the right-hand side motion detector="false",
step C1: the cashier registration device="true",
step D1: the left-hand side motion detector="false", wherein the execution of steps B1-D1 implies an erroneous registration of commodities.

28. A combined customer operated and cashier checkout counter comprising:
a. a right-hand side loading area, associated with right-hand side customers;
b. a left-hand side loading area, associated with left-hand side customers;
c. a right-hand side customer registration zone, associated with right-hand side customers and the cashier;
d. a left-hand side customer registration zone, associated with left-hand side customers and the cashier;
e. a cashier registration zone, associated with the cashier;
f. a right-hand side packing area, associated with right-hand side customers; and
g. a left-hand side packing area, associated with left-hand side customers, wherein:
the right-hand side customer registration zone is downstream of the right-hand side loading area and the right-hand side customer registration zone is configured to be operationally in communication with the right-hand side loading area;
the left-hand side customer registration zone is downstream of the left-hand side loading area and the left-hand side customer registration zone is configured to be operationally in communication with the left-hand side loading area;
the cashier registration zone is downstream of the right-hand side loading area and the left-hand side loading area, the cashier registration zone is configured to be operationally in communication with the right-hand side loading area and the left-hand side loading area independent of each other;
the right-hand side customer registration zone is associated with a motion detector at least configured to sense the motion of the arms/hands of the right-hand side customer and/or the arms/hands of the cashier downstream from the right-hand side loading area;
the left-hand side customer registration zone is associated with a motion detector at least configured to sense the motion of the arms/hands of the left-hand side customer and/or the arms/hands of the cashier downstream from the left-hand side loading area;
the cashier registration zone comprises motion detectors at least configured to sense motion of the arms/hands of the cashier downstream from the right-hand side loading area and the left-hand side loading area;
the right-hand side packing area is arranged downstream of the right-hand side registration zone and the cashier registration zone; and
the left-hand side packing area is arranged downstream of the left-hand side registration zone and the cashier registration zone.

29. The combined customer operated and cashier checkout counter according to claim 28, further comprising:
a right-hand side entrance motion detector with an interface, and
a left-hand side entrance motion detector with an interface.

30. The combined customer operated and cashier checkout counter according to claim 28 further comprising:
a right-hand side exit motion detector with an interface with the computer, and
a left-hand side exit motion detector with an interface with the computer.

31. The combined customer operated and cashier checkout counter according to claim 28 a computer including a computer program which determines whether a correct registration of commodities has taken place or not on the right-hand side and the left-hand side.

32. The combined customer operated and cashier checkout counter according to any of the claim 28 further comprising a computer including a computer program which determines whether a correct registration of commodities has taken place and if the registration shall be carried to a right-hand side customer or a left-hand side customer.

33. A method of a registration process for a right-hand side loading area and a left-hand side loading area for registration of commodities in a checkout counter where registration of commodities from the right-hand side loading area and the left-hand side loading area are independent of each other comprising the steps of:
a. providing a right-hand side registration device with an interface with a computer;
b. providing a left-hand side registration device with an interface with a computer;
c. providing a right-hand side entrance motion detector with an interface with the computer;
d. providing a left-hand side entrance motion detector with an interface with the computer;
e. providing a right-hand side exit motion detector with an interface with the computer;
f. providing a left-hand side exit motion detector with an interface with the computer; and g. providing a cashier registration means arranged between the right-hand side registration device and the left-hand side registration device.

34. The method according to claim 33, where the method further comprises the steps of: transmitting from the right-hand side entrance motion detector a "true" signal to the computer if a hand movement and/or commodity movement is sensed by the right/left-hand side entrance motion detector and transmitting from the left-hand side entrance motion detector a "true" signal to the computer if a hand movement and/or commodity movement is sensed by the left-hand side entrance motion detector.

35. The method according to claim 33, where the method further comprises the steps of: transmitting from the right-hand side exit motion detector a "true" signal to the computer if a hand movement and/or commodity movement is sensed by the right-hand side exit motion detector and transmitting from the left-hand side exit motion detector a "true" signal to the computer if a hand movement and/or commodity movement is sensed by the left-hand side exit motion detector.

* * * * *